United States Patent [19]

McLaughlin

[11] 4,070,865

[45] Jan. 31, 1978

[54] METHOD OF CONSOLIDATING POROUS FORMATIONS USING VINYL POLYMER SEALER WITH DIVINYLBENZENE CROSSLINKER

[75] Inventor: Homer Charles McLaughlin, Duncan, Okla.

[73] Assignee: Halliburton Company, Duncan, Okla.

[21] Appl. No.: 665,610

[22] Filed: Mar. 10, 1976

[51] Int. Cl.² .............................................. E02D 3/14
[52] U.S. Cl. ................................ 61/36 C; 428/538; 428/543; 428/451; 260/2.5 A; 260/DIG. 14; 166/295; 61/35; 61/36 R; 427/136; 428/515; 428/519; 428/520
[58] Field of Search .................... 428/500, 538, 543; 260/2.5H, DIG. 14; 166/33, 295; 252/8.55; 427/136; 61/35, 36

[56] References Cited

U.S. PATENT DOCUMENTS

| | | | |
|---|---|---|---|
| 2,190,003 | 2/1940 | Van Hulst | 260/DIG. 14 |
| 2,321,761 | 6/1943 | Mathis et al. | 260/DIG. 14 |
| 2,759,902 | 8/1956 | Claudi-Magnussen | 260/DIG. 14 |
| 2,801,983 | 8/1957 | Dixon et al. | 260/DIG. 14 |
| 2,838,466 | 6/1958 | Padbury et al. | 260/DIG. 14 |
| 3,625,287 | 12/1971 | Young | 166/295 |

*Primary Examiner*—P. C. Ives
*Attorney, Agent, or Firm*—Robert S. Nisbett; John H. Tregoning; Thomas R. Weaver

[57] ABSTRACT

An improved method and composition for consolidating a porous and permeable subterranean particulated formation into a high strength water resistant mass is provided by a particular combination of vinyl monomers, catalyst system and optional features such as solvent, particulate filler, chelates and binders.

17 Claims, No Drawings

METHOD OF CONSOLIDATING POROUS FORMATIONS USING VINYL POLYMER SEALER WITH DIVINYLBENZENE CROSSLINKER

There are numerous prior art consolidation systems which are used for forming gravel packs, consolidating permeable formations and sealing permeable formations. Many of these systems are limited to specific uses and have problems associated therewith. For instance, many use high viscosity resins or prepolymer compositions which are sensitive to water, carbonates or high pH formations, or are adversely affected by low or high temperatures or result in a relatively low strength consolidation.

A particular combination of monomers and catalyst systems have been discovered and make it possible to overcome many of these disadvantages. By this invention particular compositions and methods are provided for consolidating a particulate formation using a polymerizable organic liquid mixture having low viscosity with a catalyst system comprising a polymerization promotor, such as an organo metallic compound or an amine, and a polymerization initiator selected from organic peroxides, azo compounds and combinations thereof. This invention can be used for consolidating a portion of a particulate formation into a high strength, water resistant mass which is either permeable or impermeable. The compositions can be added to particulate formations in place or combined with particulate material and placed into the desired location to form a gravel pack or sand mass consolidation. The compositions can be used as a low viscosity mixture of neat monomers with catalyst components and optional additives or with a solvent. In addition, certain monomers such as styrene, divinylbenzene, acrylic acid or acrylonitrile can be used as the only monomer for a certain application, or as a reactive diluent monomer, or as a reactive diluent monomer which also serves as a catalyst. The consolidating composition can be applied to a formation, coated onto a particulate material, combined or mixed with a particulate material or injected into a particulate formation as long as the consolidating composition is in contact with the particulate formation to be consolidated and is maintained under suitable polymerization conditions until the monomers polymerize to form a high strength, water resistant mass including the particulate material. Preferred compositions include solvents, particulate fillers, chelating agents, and binders.

The compositions can be considered basically a mixture of low viscosity monomers. This mixture comprises polymerizable liquid, low viscosity monomers which consist essentially of monomers serving two functions. For certain applications one type of monomer can serve both functions. The polymerizable liquid mixture includes the catalyst system, preferred additives and optional additives, if desired, mixed with the polymerizable liquid monomers.

Monomers which serve the first function can be considered as a first group of preferred vinyl tape hydrocarbon monomers. These monomers are basically low molecular weight, low viscosity hydrocarbon monomers having about 3-12 carbon atoms and containing at least one group or radical selected from phenyl, carboxyl or nitrile. The monomer liquid mixture should be substantially all hydrocarbon monomers having at least one of these reactive groups or radicals. A small amount of other monomers can be tolerated but are not preferred. For example, monomers with ester linkages should be avoided since they are sensitive to water and temperature extremes. The low viscosity monomer mixture can include mixtures of monomers having the preferred reactive groups indicated above. Vinyl type monomers are those which have at least one reactive vinyl group represented by the formula:

The reactive groups phenyl, carboxyl or nitrile are represented by the following formulae respectively:

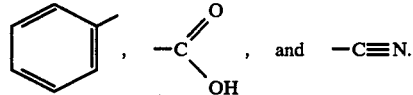

The second group of monomers are monomers which serve the second function required for the composition of this invention are the divinyl or difunctional monomers. These monomers have at least two vinyl reactive groups which can be polymerized and result in a crosslinked polymer network. These monomers are basically the same type as those for the first function except for the difunctional feature. For certain applications the difunctional monomer can be omitted. For example, for certain applications only one monomer such as styrene, acrylic acid or acrylonitrile can be used. However, a concentration of at least 1% by weight difunctional monomer or equivalent is preferred for the compositions of this invention. Examples of preferred difunctional monomers are divinylbenzene, 1,4-dibutylacrylate and polyester resin in low concentrations. The polyester resin contains maleic or fumaric groups which are actually polyfunctional and can be used, preferably in small concentrations, e.g., up to about 5%.

Examples of preferred vinyl type monomers are styrene, acrylic acid, methacrylic acids, acrylonitrile, methacrylonitrile, divinylbenzene and combinations thereof. Each of monomers should be of a type which is soluble in a low viscosity liquid aromatic hydrocarbon solvent. For low temperature applications, acrylic acid or acrylonitrile monomers should be present.

Monomers such as dimethyl itaconate, 2-ethylhexyl acrylate, methyl methacrylate, and d-2-ethylhexyl fumarate can be used.

The catalyst system or composition of this invention comprises promoters and initiators. Preferred catalyst systems for the composition of this invention have a latent period or in effect provide a delayed polymerization which allows placement of the polymerizable, low viscosity, liquid mixture before polymerization significantly affects the viscosity of the mixture. This is especially advantageous where the liquid mixture is to be pumped through a well into a subterranean formation and injected into that formation. When conventional preflushes and afterflush phases are used to control the location and coating characteristics of the polymerizable liquid mixture, this latent period can be especially advantageous.

The promoter portion of the catalyst system can be characterized as an organo metallic compound wherein the metallic portion or ion has a valence which varies with conditions. Organo metallic compounds of cobalt, nickel, iron, titanium, tin, antimony, zinc, and vanadium are preferred. These metals are generally from Classes IV through VIII of the periodic table of elements. The organic portion of the organo metallic promoter is preferably a low molecular weight hydrocarbon such as an ester which allows the metallic ion to function and promote the formation of free radicals from the other portion of the catalyst system. The organic radical can be aryl, alkyl or combinations thereof wherein the aryl or alkyl radical contains about 3-12 carbon atoms. A preferred class of organo metallic initiators are the cobalt arylates and cobalt alkylates such as cobalt naphthenate and cobalt octoate. Naphthenic acid is an old name for hexahydrobenzoic acid or cyclohexanecarboxylic acid. Generally, the class of coordination catalysts can be used for the catalyst systems of this invention. Another type of promoter which can be used is the substituted amines such as N,N-dimethyl aniline as described by: Brauer, G. M.; Davenport, R. M.; and Hansen, W. C.; "Accelerating Effect of Amines on Polymerization of Methyl Methacrylate;" November 1956, Breskin Publications, 575 Madison Ave., New York 22, N.Y., which is incorporated herein by reference.

The second portion of the catalyst system is a polymerization initiator. These are generally organic peroxides or an azonitrile type compound. The organic peroxides are preferably alkyl, aryl or combinations thereof wherein the alkyl or aryl radical has from about 3 to 12 carbon atoms. Examples of the preferred organic peroxides are t-butyl peroxide, ketone peroxide, methylethyl ketone peroxide, benzoyl peroxide, 2,5-dimethylhexane-2,5-diperbenzoate and t-butyl peroctoate. A preferred azonitrile initiator is azoisobutyronitrile. The formulas for methylethyl ketone and derived "peroxide" initiator are shown as follows:

Methylethyl ketone:

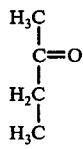

One of the forms of Methylethyl ketone peroxide:

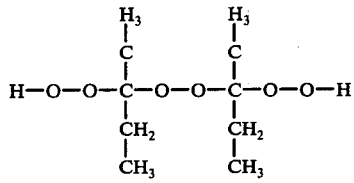

A preferred but optional class of additives is the binders. This includes silanes, organo silanes and surfactants which affect or control the dispersibility and coating characteristics of the consolidating fluid. These silanes are called "silane adhesion promoters" by Union Carbide and are also referred to as silicon compounds. The surfactants and silane materials are described in the following U.S. patents which are incorporated herein by reference, U.S. Pat. Nos.: 3,123,137; 3,415,320; 3,199,590; 3,416,601; 3,221,814; 3,437,145; 3,291,214; 3,625,287; 3,625,287.

Preferred silanes or organo silicon compounds are listed as follows:

gamma aminopropyltriethoxysilane,
N-(beta-aminoethyl)-gamma-aminopropyltrimethoxysilane,
delta-aminobutylmethyldiethoxysilane,
N-methyl-gamma-aminoisobutyltriethoxysilane,
N-methyl-gamma-aminopropyltriethoxysilane,
delta-aminobutyltriethoxysilane,
N-(beta-aminoethyl)-gamma-aminopropyltriethoxysilane,
gamma dialkylaminopropyltriethoxysilane,
glycidoxyproplytrimethoxysilane, and
3,4 epoxycyclohexylethyltrimethoxysilane.

The surfactants which can be used in the compositions of this invention are those which are soluble or readily dispersible in an organic liquid such as the low viscosity monomers or the aromatic solvents used herein. The surfactants generally control dispersion of the various components in the organic liquid mixture and affect the attraction or coating ability of the polymerizable liquid on to the particulate formation. The surfactants also help to dissolve or maintain the various additives dispersed within the organic liquid phase. Preferred surfactants are blends of anionic, cationic and nonionic surfactants. Examples of preferred surfactants include hydrocarbon quaternary ammonium salts, alkyl-aryl sulfonates, ethoxylated hydrocarbon alcohols wherein each hydrocarbon radical, e.g., alkyl, aryl or combinations thereof, has about 6-18 carbon atoms.

Several preferred but optional additives include solvents, particulate fillers and chelating agents. Solvents which can be used with compositions of this invention are normally liquid aromatic hydrocarbon solvents. This can be mineral oil but the polymer is not soluble in mineral oil. The solvent serves to reduce the viscosity and dilute the polymerizable liquid. This dilution effect can be used to increase the permeability of the resulting consolidated mass and to reduce the amount of monomers required to coat and consolidate a given particulate mass. This in effect reduces the resulting volume of polymerized network which also reduces the ultimate strength attainable. For permeable consolidations careful control of coating, removal and distribution of monomer mixture in the particulate mass may be necessary which may require the use of various preflush and afterflush systems. Chlorinated solvents should be avoided. Chlorinated hydrocarbons have an adverse effect on refinery catalysts. In extreme cases explosive hyperactivity results. Most of the time organo halogens are bad for polymer strength because of chain transfer effects. For certain applications monomers such as styrene, acrylonitrile and acrylic acid can be either a reactive monomer or a diluent or solvent which reduces the viscosity of the polymerizable liquid mixture.

Particulate fillers which can be used for compositions of this invention are preferably relatively inert solid particles. The intended use will determine the particle size, particle size distribution and reactivity required. The particulate filler should be wet by the polymerizable liquid mixture for maximum strength. Preferred fillers include silica flour which is a finely divided silica, sand and biotite, exploded vermiculite (groupd up), ground granitic and basaltic materials. Chelating agents such as 2,4-pentanedoine can be used to improve the consolidation where the polymerizable liquid mixture must pass through the particulate formation. The chelating agent combines with the promoter (cobalt salts) and other organo metallic salts to maintain them dispersed in the polymerization liquid to assure complete polymerization of the monomers. In some cases, a particulate formation can extract or adsorb components from the polymerizable liquid mixture and adversely affect the resulting polymerized structure. Other conventional additives and methods can be used with the compositions and processes of this invention in view of this disclosure. Where the consolidating mixture is used to fill or plug a large void space or vug or it is desirable to attain a high compressive strength, a particulate filler is preferred. For applications where the particulate formation or gravel pack is to be impermeable, any reactive diluent or solvent concentration should be maintained at a minimum level. The use of filler and absence of solvent maintains shrinkage of the polymerized structure to a minimum. Since the compositions of this invention are insensitive to pH fluctuation, have no effect on pH and are not dependent on pH for initiating polymerization like phenol-formaldehyde, urea-formaldehyde, etc., they can be readily used where high carbonate materials present a problem.

EXAMPLES

The following preferred formulations and examples illustrate the invention and would enable one skilled in the art to practice the invention. Numerous variations will be obvious in view of this disclosure. The optimum concentrations, reaction conditions and optional components can be readily determined for specific formulations and application with minimum experimentation in view of this disclosure.

| Preferred Components and Concentrations by Weight of Liquid Monomer Mixture | | |
|---|---|---|
| | Narrow Range | Broad Range |
| Vinyl type monomer | 0–95% | 0–100% |
| Difunctional monomer | 5–100% | 0–100% |
| Initiator | 0.01–5% | 0.01–5% |
| Promoter | 0.01–5% | 0.01–5% |
| Solvent | 0–90% | 0–90% |
| Filler | 0–85% | 0–85% |
| Binder | 0–55% | 0–55% |
| Silane | 0–50% | 0–50% |
| *-continued* | | |
| Preferred Components and Concentrations by Weight of Liquid Monomer Mixture | | |
| | Narrow Range | Broad Range |
| Surfactant | 0–5% | 0–5% |
| Temperature Range | 40–350° F | |
| Preferred viscosity (without filler) | <5 cp | <10 cp |

Generally, the polymerization rate is directly proportional to the temperature. For conventional batch polymerization the temperature can be controlled by addition or removal of heat from the polymerization vat. With subterranean or in situ polymerization the temperature and heat transfer is governed by the temperature of the well and formation. Therefore, the polymerization rate and conditions must be controlled as taught herein by adjusting the concentration of various monomers, initiators, promoters, solvents and other components. For example, at high temperature a low concentration of initiator and promoter can be used for a low polymerization rate and a low heat accumulation from the polymerization. Solvent can also be used to adsorb some heat, act as a diluent to help control polymerization rate and the viscosity as polymerization progresses. For certain high temperature applications (down to about 100° F), certain monomers such as styrene can be used alone as the only monomer, although the resulting polymer will be a gel with a softening point rather than a crosslinked gel. Solid filler can be used to increase strength and reduce problems due to softening of the gel. For a low temperature (below about 100° F), high initiator and promoter concentration or certain preferred monomers such as methacrylic acid, acrylic acid, acrylonitrile or methacrylonitrile can be used for a high polymerization rate. Esters are of little or no benefit at low temperature.

Table I describes the components used in various formulations. Table II shows preferred formulations with solvent. Table III lists preferred formulations without solvents.

TABLE I

| Identification of Components | | |
|---|---|---|
| Initiators Peroxides | Description | Source |
| t-BH-70 | 70% tert-butyl hydroperoxide and 30% ditert-butylperoxide | Wallace and Tiernam |
| TBHP-70 | Same as t-BH-70 | U.S. Peroxygen Corp. |
| FR-22 | 58% mixed Ketone peroxides in plasticizer | U.S. Peroxygen Corp. |
| MEKP | 60% methyl ethyl ketone peroxide in dimethyl phthalate | |
| BZW-70 | 70% benzoyl peroxide with 30% water | U.S. Peroxygen Corp. |
| USP-711 | 92.5% 2,5-dimethylhexane-2,5-diperbenzoate | U.S. Peroxygen Corp. |
| t-BO | tert-butyl peroctoate | U.S. Peroxygen Corp. |
| CPC-241 | An experimental peroxide | U.S. Peroxygen Corp. |
| Azo Type | | |
| VAZO-64 | azoisobutyronitrile | Du Pont |
| VAZO-88 | azocyclohexane carbonitrile | Du Pont |
| CoN | 6% cobalt naphthenate in mineral spirits | |
| CO-12 | 12% cobalt octoate in mineral spirits | |
| DMA | N,N-dimethylaniline | |
| Binders | Description | Source |
| A-151 | Vinyltriethoxysilane | Union Carbide |
| A-174 | 3-methacryloxypropltrimethoxysilane | Union Carbide |
| Surfactants | Description | Source |
| Redicote 80-S | a cationic surfactant in the form of salts derived from tallow | Armour and Company |
| Primine JM-T | a mixture of cationic amines of the formula R-$NH_2$ wherein R is a mixture of isomers having 12–14 carbon atoms with a t-alkyl structure | Rohm & Haas |
| Primine 81-R | a mixture of cationic amines of the formula R-$NH_2$ wherein R is a mixture | Rohm & Haas |

TABLE I-continued
Identification of Components

| Initiators Peroxides | Description | Source |
|---|---|---|
| | of isomers having a 18–22 carbon atoms with a t-alkyl structure | |
| Oleic Acid | crude oleic acid - approximately 70% oleic + linoleic + linolenic and other other fatty saturates | |
| 9-11 Acid | 9,11-octadecadienoic | |
| MMA | Methyl methacrylate | Rohm & Haas |
| DMDA | 1,3-butylene dimethacrylate | Rohm & Haas |
| ACN | Acrylonitrile | Matheson, Coleman & Bell |
| DBF | Dibutyl fumarate | Chas. Pfizer & Co., Inc. |
| STY | Styrene | |
| DVB | divinylbenzene | |
| MAA | Methacrylic acid | |
| AA | Acrylic acid | |
| Solvents | Description | Source |
| Panasol AN-3 | Mixture of 95% aromatic hydrocarbons. AN-3 is principally ethyl naphthalene. | Amoco |
| Mineral Oil | A substantially aliphatic hydrocarbon having a viscosity in the range of about 1-10 cp. | |

TABLE II
Preferred Formulations at 160° F

| Formulation No. | Components | Weight gms | Remarks |
|---|---|---|---|
| 1 | Maleic anhydride | 10 | After 20 minutes |
| | Styrene | 0 | mixture cloudy. |
| | Divinylbenzene | 1 | After 25 minutes |
| | Solvent | 80[a] | mixture formed |
| | Initiator[b] | 0.5 | mush. |
| 2 | Maleic anhydride | 10 | After 35 minutes |
| | Styrene | 9 | violent polymerization. |
| | Divinylbenzene | 1 | |
| | Solvent | 80[c] | |
| | Initiator[b] | | |
| 3 | Styrene | 18 | Less than 24 hours- |
| | Divinylbenzene | 2 | clear gel |
| | Solvent | 80[c] | |
| | Initiator[b] | | |

[a] Aromatic solvent Panasol AN-3.
[b] Azoisobutyronitrile (VAZO)
[c] Benzene

TABLE III
Preferred Formulations

| Formulation | Mixing Sequence | Material | Formulation Parts by Weight[c] Typical | Range |
|---|---|---|---|---|
| A (>100° F) | 1 | 60% Divinylbenzene | 5 | — |
| | 2 | Styrene | 95 | — |
| | 3 | Initiator | 1 | — |
| | 4 | Promoter | 1 | — |
| | 5 | Filler | 340 | — |
| B (>100° F) | 1 | 60% Divinylbenzene | 5 | — |
| | 2 | Styrene | 95 | — |
| | 3 | Initiator | 1 | — |
| | 4 | Promoter | 1 | — |
| C (<100° F) | 1 | 60% Divinylbenzene | 5 | 1-100% |
| | 2 | Styrene | 65 | 1-100% |
| | 3 | Copolymer[a] | 30 | 0-50% |
| | 4 | Initiator | 1 | — |
| | 5 | Promoter | 1 | — |
| | 6 | Filler | 340[b] | — |
| D (<100° F) | 1 | 60% Divinylbenzene | 5 | 1-100% |
| | 2 | Styrene | 65 | 1-100% |
| | 3 | Copolymer[a] | 30 | 0-50% |
| | 4 | Initiator | 1 | 0.1-5% |
| | 5 | Promoter | 1 | — |

[a] Copolymer (in order of preference for lower temperature): Acrylonitrile, acrylic acid, methacrylic acid, methacrylonitrile.
[b] This amount may not be attainable when acrylic acid or methacrylic acid is used due to hydrogen bonding.
[c] Each range of formulation component is in Percent by Weight of monomers.

It is preferred to omit solvents because the resultant strength reduction outweighs the volume gain. Fillers are used where macrovoids are to be sealed while fillers are omitted when capillaries are to be sealed.

TABLE IV
Examples of Solvents and Substitutions For Styrene - Tests at 200° F

| Ex. No. | Composition Chemicals | Parts | Gel Time Minutes |
|---|---|---|---|
| 1 | 2-Ethylhexyl acrylate | 11 | |
| | Styrene | 9 | |
| | Divinylbenzene | 2 | |
| | Mineral oil | 78 | |
| | Azoisobutyronitrile | 0.5 | 40 |
| 2 | Methyl methacrylate | 15 | |
| | Divinylbenzene | 5 | |
| | Panasol AN-3[a] | 80 | |
| | Azoisobutyronitrile | 0.5 | 16 |
| 3 | cinvinylbenzene | 20 | |
| | Panasol AN-3 | 80 | |
| | 70% t-Butyl hydroperoxide | 1.0 | |
| | 6% Cobalt naphthenate | 1.0 | 167 |
| 4 | D-2-ethylhexyl fumarate | 20 | |
| | Styrene | 7 | |
| | Divinylbenzene | 3 | |
| | Panasol AN-3 | 70 | |
| | 70% t-butyul hydroperoxide | 0.5 | |
| | 70% benzoyl peroxide | 0.5 | 1440 |
| 5 | Dimetyl itaconate | 10 | |
| | Styrene | 15 | |
| | Divinylbenzene | 5 | |
| | Panasol AN-3 | 83 | |
| | Azoisobutyronitrile | 0.5 | 45 |

[a] Typical Properties of Panasol AN-3:
| | |
|---|---|
| Flash Point, COC: | 220° F (104° C) |
| Major Constituents: | 95% aromatic hydrocarbons principally ethyl naphthalene |
| Gravity: | 12.0° API |
| IBP: | 440° F (227° C) |
| EP: | 550° F (288° C) |
| Mixed Aniline Point: | 57° F (14° C) |
| Viscosity, SSU at 100° F: | 45° |

The above tests serve to indicate the scope of this invention with respect to monomers that can be used.

TABLE V

Preferred Formulations
Initiator and Promoter Examples With 95 grams-Styrene,
5 grams-60% Divinylbenzene

| Test No. | Initiator 1 Gram | Promoter, Grams CoN | CO-12 | DMA | Temp. °F | Gel Time Minutes | Compressive Strength PSI - 24 Hours |
|---|---|---|---|---|---|---|---|
| 1 | BZW-70 | 0 | 0 | 1 | 80 | 1300 | Friable |
|   |        |   |   |   | 120 | 250 | 147 |
|   |        |   |   |   | 180 | 53 | Very Soft |
| 2 | USP-711 | 0 | 0 | 1 | 80 |  | 0 |
|   |         |   |   |   | 120 |  | 0 |
|   |         |   |   |   | 180 | 120 | 5,038 |
| 3 | t-BO | 0 | 0 | 1 | 80 | >7200 | 0 |
|   |      |   |   |   | 120 | >300 | 6,744 |
|   |      |   |   |   | 180 | 30 | 5,426 |
| 4 | t-BH-70 | 1 | 0 | 0 | 80 | 1440 | 5 |
|   |         |   |   |   | 120 | 300 | 121 |
|   |         |   |   |   | 160 | 120 | 12,602 |
|   |         |   |   |   | 180 | 60 | 13,980 |
| 5 | t-BH-70 | 0 | 1 | 0 | 80 | <2500 | Gel |
|   |         |   |   |   | 100 | <1200 | Gel |
|   |         |   |   |   | 120 | — | Gel |
| 6 | t-BH-70 | 1 | 0 | 1 | 100 | — | 7,607 |
|   |         |   |   |   | 120 | 325 | 9,998 |
| 7 | TBHP-70 | 1 | 0 | 0 | 80 | 2500 | Gel |
|   |         |   |   |   | 100 | 1200 | Gel |
|   |         |   |   |   | 120 | — | Gel |
| 8 | TBHP-70 | 0 | 1 | 0 | 80 | 2100 | Gel |
|   |         |   |   |   | 100 | 1200 | Gel |
|   |         |   |   |   | 120 | — | Gel |
| 9 | TBHP-70 | 0 | 1 | 1 | 100 | — | Gel |
|   |         |   |   |   | 120 | — | 7,743 |
| 10 | MEKP | 1 | 0 | 0 | 80 | <1200 | 4 |
|    |      |   |   |   | 100 | >500 | 20 |
|    |      |   |   |   | 120 | 295 | 381 |
| 11 | MEKP | 1 | 0 | 1 | 80 | <1200 | 10 |
|    |      |   |   |   | 100 | 870 | 7,935 |
|    |      |   |   |   | 120 | 220 | 10,456 |
| 12 | FR-222 | 1 | 0 | 0 | 80 | <1000 | 28 |
|    |        |   |   |   | 100 | 420 | 315 |
|    |        |   |   |   | 120 | 211 | 9,380 |
|    |        |   |   |   | 140 | 140 | 10,355 |
|    |        |   |   |   | 160 | 66 | 12,223 |
|    |        |   |   |   | 180 | 43 | 14,0303 |
| 13 | FR-222 | 0 | 1 | 0 | 100 | — | 4,674 |
|    |        |   |   |   | 120 | 162 | 10,162 |
| 14 | FR-222 | 0 | 0.5 | 0 | 100 | — | 7,823 |
|    |        |   |   |   | 120 | 200 | 10,393 |
| 15 | FR-222 | 1 | 0 | 1 | 80 | <1200 | 6 |
|    |        |   |   |   | 100 | 425 | 6,686 |
|    |        |   |   |   | 120 | 215 | 10,659 |

TABLE VI

Low Temperature Tests
Initiator and Promoter: 1 gram BZW-70, 1 gram dimethylaniline

| Test No. | Monomer System Chemicals | Grams | Gel Time Minutes at 75° F | Remarks |
|---|---|---|---|---|
| 1 | Maleic anyhydride | 15 |  | at 75° F - Spongy set |
|   | Styrene | 80 |  | at 120° F in 7 min. set (explodes) |
|   | 60% Divinylbenzene | 5 | 12 |  |
| 2 | Maleic anhydride | 15 |  | 6% cobalt naphthenate substi- |
|   | Styrene | 80 |  | tuted for dimethylaniline. |
|   | 60& Divinylbenzene | 5 | Never | at 120° F in 127 min. set (explodes) |
| 3 | Maleic anhydride | 15 |  | Spongy set |
|   | Styrene | 45 |  |  |
|   | 60% Divinylbenzene | 5 |  |  |
|   | Methacrylic acid | 15 |  |  |
|   | Ethyl acetate* | 20 | 15 |  |
| 4 | Methyl methacrylate | 20 |  | Weak set in 3 days |
|   | Styrene | 75 |  |  |
|   | 60% Divinylbenzene | 5 | 1440 |  |
| 5 | Methyl methacrylate | 40 |  | Stronger than Test 4 but still |
|   | Styrene | 55 |  | weak in 3 days |
|   | 60% Divinylbenzene | 5 | 300 |  |
| 6 | Butyl methacrylate | 30 |  | Weak set in 3 days |
|   | Styrene | 65 |  |  |
|   | 60% Divinylbenzene | 5 | 1440 |  |
| 7 | Styrene | 95 |  | at 75° F - Weak set in 6 days |
|   | 60% Divinylbenzene | 5 | 1620 | at 120° F - 244 min., 3,875 psi (24 hours) |
| 8 | Styrene | 80 |  | at 75° F - 7 psi (24 hours) |
|   | Methacrylic acid | 15 |  | at 120° F - 75 min., 15 psi 824 hours) |
|   | 1,3 Butylene Dimethacrylate | 5 | 425 |  |
| 9 | Styrene | 70 |  | at 75° F - 27 psi in 24 hours |
|   | Methacrylic acid 25 |  | at 120° F - 65 min., 105 psi in 24 hours |  |
|   | 1,3 Butylene dimethacrylate | 5 | 275 |  |

TABLE VI-continued

Low Temperature Tests
Initiator and Promoter: 1 gram BZW-70, 1 gram dimethylaniline

| Test No. | Monomer System Chemicals | Grams | Gel Time Minutes at 75° F | Remarks |
|---|---|---|---|---|
| 10 | Styrene | 50 | | at 75° F - 158 psi in 24 hours |
| | Methacrylic acid | 15 | at 120° F - 27 min., 27 psi in | |
| | Methyl methacrylate | 30 | | hours |
| | 1,3 Butylene dimethacrylate | 5 | 352 | |
| 11 | Styrene | 80 | | at 75° F - 14 psi in 24 hours |
| | Methacrylic acid | 15 | | at 120° F -38 min, 35 psi in |
| | 60% Divinylbenzene | 5 | 1 | 24 hours |
| 13 | Styrene | 50 | | at 75° F - 700 psi in 24 hours |
| | Methacrylic acid | 15 | | at 120° F - 40 min., in 3,878 psi |
| | Methyl methacrylate | 30 | | 24 hours |
| | 60% Divinylbenzene | 5 | 160 | |

*Ethyl acetate is a solvent not a monomer.

Test 7 is the control test. It shows that it is difficult to obtain a set with styrene and divinylbenzene alone at low temperatures such as 75° F.

The methacrylate esters Tests 4, 5, and 6 yield only modest aid in speeding up the gel time. However, methacrylic acid gives definite aid in speeding up gel time in Test Test 9 through 13.

TABLE VII

Low Temperature Tests

| Test No. | Monomers, Grams STY | DVB | MAA | Additional Chemical | Additional Monomer Grams | Peroxide-Promoter System 1 Gm. Ea. | Gel Time Minutes 75° F | 120° F | Compressive Strength PSI - 24 Hrs. 75° F | 120° F |
|---|---|---|---|---|---|---|---|---|---|---|
| 1 | 80 | 5 | 15 | None | 0 | BZW-70 DMA | 231 | 38 | 14 | 35 |
| 2 | 70 | 5 | 25 | None | 0 | BZW-70 DMA | 120 | 20 | 140[1] | 2,366 |
| 3 | 65 | 5 | 30 | None | 0 | BZW-70 DMA | 90 | 20 | 200 | 1,926 |
| 4 | 50 | 5 | 15 | MMA | 20 | BZW-70 DMA | 160 | 40 | 700[2] | 70 |
| 5 | 65 | 5 | 30 | None | 0 | t-BH-70 CoN | 2,200 | 250 | Gel[3] | 13,953 |
| 6 | 33 | 5 | 22 | None | 0 | FR-222 CoN | >480 | 95 | 1,024 | 2,219 |
| 7 | 65 | 5 | 30 | None | 0 | FR-222[4] CoN[4] | 164 | 26 | 2,604 | 9,878 |
| 8 | 90 | 11 | 0 | None | 0 | t-BH-70 CoN | 2,200 | 300 | Gel[3] | 170[7] |
| 9 | 54 | 5 | 31 | ACN | 11 | FR-222 CoN | 298 | 27 | 3,482 | 7,929[5] |
| 10 | 40 | 5 | 0 | DBF | 55 | FR-222 CoN | 202 | 40 | Gel[6] | Gel[6] |

[1] at 100° 2,230 psi.
[2] at 100° 3,878 psi.
[3] 48 hr. set.
[4] FR-222: 2 grams, CoN: 2 grams.
[5] This set was damaged by boiling. At 200° the strength was 10,316 psi.
6These sets ultimately made a good rubber in 5 days.
[7] 180° : Gel time - 40 mins; 24 hr. compressive strength - 10,352 psi.

Tests 6 and 7 indicate that with the proper Peroxide-Promoter System that the 75° F compressive strength can be raised to a respectable level.

TABLE VIII

Survey of Possible Room Temperature Polymerizations Using Divinylbenzene

| Formula: | Styrene | Variable |
|---|---|---|
| | Divinylbenzene | 5.0 g |
| | Copolymer 1 | Variable |
| | Copolymer 2 | Variable |
| | 6% Cobalt Naphthenate | 1.0 g |
| | Dimethylamiline | 1.0 g |
| | t-BH-70 | 1.0 g |

Mixing Sequence: In the above order
Temperature: 72-74° F

| Test No. | Formula Tested Chemical | Grams | Latent Time Minutes | Compressive Strength Hours | PSI |
|---|---|---|---|---|---|
| 1 | Styrene | 65.0 | | 24 | 3.231 |
| | Methacrylic acid | 30.0 | 154[a] | 96 | 4,251 |
| 2 | Styrene | 65.0 | 88[b] | 24 | 8,928 |
| | Methacrylic acid | 30.0 | | 48 | 8,928 |
| 3 | Styrene | 65.0 | 32[b] | 24 | 8,503 |
| | Acrylic acid | 30.0 | | 96 | 8,503 |
| 4 | Styrene | 65.0 | | | |
| | Acrylic acid | 15.0 | 197 | 24 | 10,629[c] |
| | Acrylonitrile | 15.0 | | 96 | 9,778[c] |
| 5 | Styrene | 65.0 | 137[b] | 24 | 8,120 |
| | Acrylonitrile | 30.0 | | 96 | 9,608 |
| 6 | Styrene | 60.0 | | 24 | 2,040 |
| | Acrylonitrile | 35.0[b] | 102[b] | 48 | 3,146 |
| 7 | Styrene | 55.0 | | 24 | 1,445 |
| | Acrylonitrile | 40.0 | 109[b] | 48 | 2,806 |
| 8 | Styrene | 52.1 | | 24 | 935 |
| | Acrylonitrile | 42.7 | 101[b] | 48 | 1,530 |
| 9 | Styrene | 34.5 | | | |
| | Vinyl acetate | 28.6 | >1440 | 24 | 0 |
| | Maleic anhydride | 31.9 | | | 1,700 |
| 10 | Styrene | 0 | | | |
| | Maleic anhydride | 50 | | | |
| | Vinyl acetate | 45 | Never | 96 | 0 |
| 11 | Styrene | 0 | | | |
| | Vinyl acetate | 95 | Never | 96 | 0 |
| 12 | Styrene | 0 | | | |
| | Triallyl phosphate | 5[e] | Never | 96 | 0 |
| 13 | Styrene | 0 | | | |
| | 2-Ethylhexyl acrylate | 95 | Never | 96 | 0 |
| 14 | Styrene | 0 | | | |
| | 2-ethylhexyl | | | | |

TABLE VIII-continued
Survey of Possible Room Temperature Polymerizations Using Divinylbenzene

| | methacrylate | 95 | Never | 96 | 0 |

[a] FR-222, 0.5 g, and t-BH-70, 0.5 g, were substituted for t-BH-70, 1.0 g.
[b] FR-222 was substituted for t-BH-70.
[c] The set was cracked.
[d] The divinylbenzene was increased to 10 g.
[e] Triallyl phosphate was substituted for divinylbenzene.
[f] "Never" is to the limit of observation which was about 96 hours.

TABLE IX
Gel Time Control Tests With Acrylonitrile
Formulation: 60% divinylbenzene - 5 grams; FR-222 - 1 gram; 6% cobalt naphthenate - 1 gram

| Test No. | Monomers Grams STY | ACN | Gel Time, Minutes at °F 70 | 100 | 130 | 140 | 160 | Compressive Strength - PSI in 24 Hours[f] 70 | 100 | 120 | 140 | 160 |
|---|---|---|---|---|---|---|---|---|---|---|---|---|
| 1 | 95 | 0 | 5,000 | 800 | 220 | 115 | 63 | 0 | 71 | 9,006 | 12,550 | 13,166 |
| 2 | 93 | 2 | 1,800 | 315 | 150 | — | — | 10 | 153[b] | 10,302 | — | — |
| 3 | 90 | 5 | 630 | 214 | 109 | 54 | 22 | 30 | 2,942 | 9,997 | 12,441 | 12,576 |
| 4 | 85 | 10 | 445 | 170 | 85 | 49 | 27 | 139[b] | 4,871 | 11,222 | 12,080 | 15,322 |
| 5 | 75 | 20 | 300 | 103 | 53 | 34 | 14 | 2,150 | 10,668[a] | 10,280[a] | 7,280[a] | 3,334[a] |
| 6 | 65 | 30 | 215 | 68 | 40 | — | — | 10,378 | 5,932[a] | 5,675[a] | — | — |
| 7 | 75 | 20[c] | 600 | 115 | 58 | 25 | 15 | 3,973 | 7,432 | 9,778 | 6,160[a] | 792[a] |
| 8 | 75 | 20[d] | — | — | 600 | 117 | 42 | 0 | 0 | 1,380[b] | 9,420 | 3,196[a] |
| 9 | 75 | 20[e] | 600 | 117 | 60 | 37 | 25 | 120 | 6,336 | 11,298 | 11,883 | 12,927 |

[a] The set was damaged by boiling due to heat of polymerization.
[b] Rubbery.
[c] Only 0.5 grams 6% cobalt naphthenate used.
[d] There was no 6% cobalt naphthenate used.
[e] The catalyst system was halved; 0.5 grams FR-222 and 0.5 grams 6% cobalt naphthenate were used.
[f] The samples were cured at the temperature °F indicated but tested at room temperature (73° F).

In Table IX, it can be seen that a gel time and compressive strength system can be made by varying the acrylonitrile-styrene ratio; note the orderly series with Tests 1 through 6. Also, Tests 7, 8 and 9 show that with additional manipulation of the promoter-initiator system that greater flexibility is possible.

TABLE X
Fillers for Preventing Shrinkage
Formulation: Styrene - 95 grams; 60% divinylbenzene - 5 grams; 6% cobalt naphthenate - 1 gram.

| Test No. | Initiator 1 gram | Additives Material | Grams | Temp. °F | Gel Time Minutes | Compressive Strength PSI-24 Hrs. | Shrinkage Diameter % |
|---|---|---|---|---|---|---|---|
| 1 | t-BH-70 | None | 0 | 80 | 1,440 | 5 | 0 |
| | | | | 120 | 330 | 150 | 1.6 |
| | | | | 160 | 120 | 12,602 | 4.2 |
| | | | | 180 | 60 | 13,890 | 5.0 |
| 2 | t-BH-70 | Silica flour (270 mesh) | 340 | 80 | >5,000 | — | — |
| | | Attapulgite | 5 | 120 | >400 | 7,990[a] | 0.3 |
| | | | | 160 | 230 | 13,554[a] | 0.6 |
| | | | | 180 | 60 | 12,127[1] | 0.3 |
| 3 | FR-222 | None | 0 | 80 | <1,220 | 26 | 0.7 |
| | | | | 100 | 420 | 315 | 4.9 |
| | | | | 120 | 209 | 9.230 | 5.9 |
| | | | | 140 | 165 | 10,455 | 7.3 |
| | | | | 160 | 68 | 12,222 | 3.3 |
| 4 | FR-222 | Silica flour (270 mesh) | 291[c] | 80 | 600 | 212 | 0 |
| | | Attapulgite | 5 | 120 | 240 | 7.097 | 6.8 |
| | | | | 160 | 120 | 11,004 | 0.9 |
| | | | | 180 | 60 | 3,605 | 6.9 |
| 5 | FR-222 | Silica flour (270 mesh) | 192[c] | 75 | <1,100 | 4 | 0 |
| | | Attapulgite | 6.9 | 100 | <1,100 | 7 | 0 |
| | | | | 120 | 1,100 | 190 | 3.3 |
| | | | | 140 | >200 | '2,465 | 1.7 |
| | | | | 160 | 120 | 9.956 | 1.1 |
| | | | | 180 | 40 | 12,056 | 7.3 |
| 6 | FR-222 | Methacrylic Acid | 30[b] | 75 | — | 9.677 | 2.9 |
| | | | | 120 | — | 5,495 | 2.9 |
| | | Silica flour (270 mesh) | 154[c] | 160 | — | 11,020 | 2.5 |
| | | Attapulgite | 3.6 | 180 | — | 4,494 | 0.42 |

[a] Five day test for both compressive strength and shrinkage.
[b] The methacrylic acid was substituted for 30 grams of the styrene.
[c] This is all of the silica flour that could be added and still have a pumpable slurry.

When the monomer system of this invention is placed in vugs and cracks as contrasted to capillary systems, it is desirable to reduce the shrinkage caused by polymerization. This is done by using fillers. In Table X, it can be seen that the shrinkages in Test 2 are considerably less than the corresponding runs in Test 1. The purpose of the attapulgite is to prevent the ground silica flour filler from sedimentating.

TABLE XI
Strengthening Silica Filled Polymers By Including A Reactive Binding Agent In The Silica-Monomer Slurry

| Formula. | Divinylbenzene | - 5 grams |
|---|---|---|
| | Styrene | - 65 grams |
| | Acrylonitrile | - 30 grams |
| | 6% Cobalt naphthenate | - 1 gram |
| | N,N-Dimethylaniline | - 1 gram |
| | 70% I-Butyl hydroperoxide | - 1 gram |

| Tes No. | Silica* Content Per Formula Unit | Reactive Binding Agent** | Compressive Strength PSI in 24 Hours 80° F | 100° F | 120° F |
|---|---|---|---|---|---|
| 1 | None | None | 7,088 | 10,581 | 6,347 |
| 2 | 340 g | None | 1,626 | 9.492 | 12,759 |
| 3 | None | 1 g | 11,044 | 11,417 | 6,492 |
| 4 | 340 g | 1 g | 17,656 | 20,298 | 25,373 |

*The silica is 270 mesh.
**The Reactive Binding Agent is methacryloxypropyltrimethoxysilane.

Certain organosilicon compounds promote adhesion between silica flour and organic polymers. Examples are gammaglycidoxypropyltrimethoxysilane and cloropropyltrimethoxysilane. However, in this invention it is preferred to use a binding agent (adhesion promoter) with a reactive double bond in it so that it can participate in polymerization with the other monomers and thus firmly stitch the polymer to the silica by continuous chemical bonds. Examples are vinyltrichlorosilane, vinyltriethoxysilane, vinyltrimethoxysilane, and gamma-methacryloxypropyltrimethoxysilane. Table XI demonstrates that there is a definite improvement in compressive strength of the polymerized slurry (compare Test 2 with Test 4) when the binding agent is used. The binding agent should also promote adhesion to the formation surface. Because of this the binding agent is useful even when no filler is used.

TABLE XII

Test of Surfactants and Other Additives Using FR-222 In The Formula

Formula:
- Styrene - 65 grams
- Divinylbenzene - 5 grams
- Acrylic Acid - 30 grams
- 6% Cobalt naphthenate - 1 grams
- Additive - Variable
- FR-222 - 1 gram
- Silica flour - Variable Mixing Sequence: as listed above
Temperature: 73° F

| Test No. | Additives Used Chemical | Grams | Latent Time$^a$ Minutes | Silica Flour Maximum Grams | Compressive Strength Neat | With Silica Flour |
|---|---|---|---|---|---|---|
| 1 | Acrylonitrile$^b$ | 30 | 171 | 269 | 4,115 | 5,144 |
| 2 | Control | — | 74 | 196 | 6,462 | 8,545 |
| 3 | Calcium carbonate$^c$ | — | 74 | 140$^c$ | 6,462 | 10,204 |
| 4 | Oleic Acid | 1 | 94 | 230 | 6,292 | 10,204 |
| 5 | 9-11 Acid | 1 | 96 | 198 | 5,952 | 10,204 |
| 6 | A-151 | 1 | 87 | 228 | 8,503 | 11,054 |
| 7 | Redicote 80-S | 1 | 98 | 340 | 5,697 | 8.078 |
| 8 | Redicote 80-S | 1 | 102 | 340 | 6,037 6,547$^d$ | 7,653 9.056$^d$ |
| 9 | Redicote 80-S A-174 | 1 1 | 100 | 340 | 3,656 7,185$^d$ | 14,030 14,880$^d$ |
| 10 | A-174 | 1 | 76 | 223 | 6,207 | 13,329 |
| 11 | Methacrylic Acid$^g$ Redicote 80-S A-174 Dimethylaniline | 30 1 1 1 | 330 | 340 | Rubbery 425$^d$ | Rubbery 9,353$^d$ |
| 12 | Dimethylaniline Primine JMT | 1 1 | 32 | 291 | 1,275$^e$ | 11,904$^f$ |
| 13 | Dimethylaniline Primine 81-R | 1 1 | — | 275 | — | 11,900 |
| 14 | Methacrylic Acid$^g$ Dimethylaniline | 30 1 | 87$^h$ | — | 8,759$^h$ 9.034$^{h,d}$ | — — |
| 15 | Acetylacetone | 1 | 62 | — | 11,054 11,479$^d$ | — |
| 16 | Acetylacetone Cobalt Benzoate$^i$ | 1 0.2 | 74 | — | 12,755 12,750$^d$ | — |
| 17 | Acetylacetone Cobalt benzoate$^i$ Dimethylaniline | 1 0.2 1 | 19 | — | 6,377$^f$ 4,676$^{f,d}$ | — |
| 18 | Acetylacetone Cobalt benzoate$^i$ Dimethylaniline | 1 1 1 | 16 | — | 9.608$^f$ 8,928$^{f,d}$ | |

$^a$Latent time was obtainable for the neat (without silica flour) material only.
$^b$Acrylonitrile was substituted for acrylic acid.
$^c$Calcium carbonate was substituted for silica flour. Test 3 used the same masterbatch as Test 2.
$^d$Methacrylic acid was substituted was acrylic acid.
$^e$There was an unset layer on top.
$^f$The sample was cracked.
$^g$Methacrylic acid was substituted for acrylic acid.
$^h$This is the average of four tests.
$^i$Cobalt benzoate was substituted was 6% cobalt naphthenate.

TABLE XIII

Tests of Surfactants with t-BH-70 In The Formula
Temperature - 77° f

Formula:
- Styrene - 65 grams
- Divinylbenzene - 5 grams
- Acrylic acid - 30 grams
- 6% cobalt naphthenate - 1 gram
- Additive - Variable
- Dimethylaniline - 1 gram
- t-BH-70 - 1 gram

| Test No. | Additives Used Chemical | Grams | Latent Time$^a$ Minutes | Silica Flour Maximum Grams | Compressive Strength Neat With | Silica Flour |
|---|---|---|---|---|---|---|
| 1 | Acrylonitrile$^b$ | 30 | 473 | 301 | 3,018 | 467 |
| 2 | Acrylonitrile$^b$ A-151* | 30 1 | 474 | 340 | 2,721 | 467 |
| 3 | Contro$^e$ | — | 86 | 220 | 4,591$^c$ | 10,013 |

TABLE XIII-continued

Tests of Surfactants with t-BH-70 In The Formula
Temperature - 77° f

Formula:
- Styrene - 65 grams
- Divinylbenzene - 5 grams
- Acrylic acid - 30 grams
- 6% cobalt naphthenate - 1 gram
- Additive - Variable
- Dimethylaniline - 1 gram
- t-BH-70 - 1 gram

| Test No. | Additives Used Chemical | Grams | Latent Time$^a$ Minutes | Silica Flour Maximum Grams | Compressive Strength Neat With | Silica Flour |
|---|---|---|---|---|---|---|
| 4 | Dimethylaniline | 0 | 1440 | 230 | 6,059$^{c,d}$ No set Rubber$^d$ | 12,389$^d$ No set Rubber$^d$ |
| 5 | Redicote 80-S | 1 | 209 | 340 | 3,401$^c$ 11,462$^{c,d}$ | 9.948 13,180$^d$ |
| 6 | Redicote 80-S A-174** | 1 1 | 159 | 340 | 3,826$^e$ 6,460$^e$ | 16,666 19.882$^d$ |
| 7 | A-174 | 1 | 161 | 237 | — 3,401$^{e,d}$ | 12,414$^c$ 16,156$^{d,c}$ |

$^a$Latent time was obtainable with neat (without silica flour) only.
$^b$Acrylonitrile was substituted for acrylic acid.
$^c$Specimen was slightly cracked.
$^d$This is a 48 hour test.
$^e$This test is an average of three runs.
*A-151 is vinyltriethoxysilane.
**A-174 is gamma-methacryloxypropyltrimethoxysilane.

TABLE XIV

Sealing Tests in Sand

| Chemicals | Parts by Weight | Purpose |
|---|---|---|
| 60% Divinylbenzene | 5 | Crosslinker |
| Styrene | 95 | Monomer |
| 6% cobalt naphthenate | 1 | Promoter |
| N,N-dimethylaniline | 1 | Promoter |
| 70% t-butyl hydroperoxide | 1 | Initiator |

The above formula gave the following results:

| Temperature | Compressive Strength 96 Hours, PSI |
|---|---|
| 75° F | 7,992 |
| 100° F | 10,298 |
| 120° F | 12,134 |

When injected into a water producing 70–170 mesh sand with a permeability of approximately 10 darcies, the results were 99.61% and 99.95% water shut off for two tests (170° F in 24 hours).

TABLE XV

Aging Tests at 300° F

| Chemical | Batch I | Batch II$^a$ |
|---|---|---|
| Styrene | 950 grams | 950 grams |
| 60% divinylbenzene | 50 grams | 50 grams |
| 6% cobalt naphthenate | 10 grams | 10 grams |
| t-BH-70 | 10 grams | 10 grams |
| Silica (270 mesh) | 0 grams | 3400 grams |

The above batches were cased into 2.16 cm diameter columns and cured at 180° F. Then the columns were cut into 4.4 cm samples and aged at 300° F. Each sample was weighted, micrometer measured, and marked for identity before it was placed in water in the 300° F autoclave.

| | Batch I (No Silica) | | | Batch II$^a$ (With Silica) | | |
|---|---|---|---|---|---|---|
| Days of Aging | Compressive Strength PSI$^c$ | % Weight Retained | % Volume Retained | Compressive Strength PSI$^c$ | % Weight Retained | % Volume Retained |
| 0$^b$ | 13,700 | 100.0 | 100.0 | 10.963 | 100.0 | 100.0 |
| 1 | 12,130 | 100.4 | 100.1 | 9,730 | 100.3 | 101.4 |
| 2 | 11,940 | 100.4 | 97.7 | 9,370 | 100.7 | 101.3 |
| 8 | 12,560 | 100.4 | 100.5 | 9,360 | 101.4 | 101.3 |
| 19 | 13,715 | 100.4 | 99.4 | 9,695 | 101.2 | 99.6 |
| 72 | 11,400 | 99.9 | 99.4 | 8,400 | 101.6 | 101.9 |
| 201 | 13,116 | 100.0 | 100.6 | 10,346 | 101.4 | 99.7 |
| 305 | 13,718 | 99.9 | 98.9 | 10,426 | 101.4 | 99.4 |
| Average | 12,790 | 100.15 | 99.6 | 9,790 | 101.0 | 100.6 |

$^a$Actually only half this amount of Batch II was mixed because of the increased volume resulting from the silica filler.
$^b$24 hour cure at 180° F only.
$^c$Cooled to room temperature.

Table XV shos that compositions and methods of this invention can produce a sealing material that has no significant deterioration at high temperature in almost a year. The % weight retained in Batch II indicates that the silica filler is not a source of water entry into the material.

TABLE XVI

Formula:
| Chemical | Grams |
|---|---|
| Styrene | 65.0 |
| Divinylbenzene | 5.0 |
| Acrylic acid* | 30.0 |
| Ligand | 1.0 |
| 5% cobalt naphthenate | 1.0 |
| FR-222 | 1.0 |

Cobalt Complexing Agent
Temperature: 73° F
Mixing Sequence: as listed in the formula above.

| Test No. | Ligand Tested | Solubility | Set | Sediment mm | Color Set Resin |
|---|---|---|---|---|---|
| 1 | 8-hydroxyquinoline | Good | No | — | — |
| 2 | dimethylglyoxime | Good | No | — | — |
| 3 | tetramethylthiuram | | | | |

TABLE XVI-continued

| Formula: | Cobalt Complexing Agent | |
|---|---|---|
| | Chemical | Grams |
| | Styrene | 65.0 |
| | Divinylbenzene | 5.0 |
| | Acrylic acid* | 30.0 |
| | Ligand | 1.0 |
| | 5% cobalt naphthenate | 1.0 |
| | FR-222 | 1.0 |

Temperature: 73° F
Mixing Sequence: as listed in the formula above.

| Test No. | Ligand Tested | Solubility | Set | Sediment mm | Color Set Resin |
|---|---|---|---|---|---|
| | nonosulfide | Poor | No | — | — |
| 4 | tetraethylthiuram disulfite | Good | No | — | — |
| 5 | diphenylthiocarbazone | Fair | No | — | — |
| 6 | p-nitrosophenol | Very poor | No | — | — |
| 7 | nitrilotriacetic acid | Very poor | No | — | — |
| 8 | p-nitrophenol | Poor | Yes | 6 | Yellow-red |
| 9 | o-nitrophenol | Good | No | — | — |
| 10 | salicylic acid | Good | Yes | 5 | Clear |
| 11 | 1-nitroso-2-naphthol | Fair | No | — | — |
| 12 | ethyl acetoacetate | Good | Yes | 7 | Clear |
| 13 | ethylenedinitrilo-tetracetic acid | Very poor | No | — | — |
| 14 | 2-nitropropane | Good | Yes | 5 | Clear |
| 16 | Control (nothing) | — | Yes | 6 | Clear |
| 17 | acetylactone | Good | Yes | 2 | Green |
| 18 | acetylacetone** | Good | 90% | 4 | Yellow |

*Methacrylic acid was substituted for acrylic acid in Tests 6 through 18.
**The cobalt naphthenate and acetylacetone were mixed before adding.

When the formula is squeezed into a wet sand, the cobalt plates out on the sand. Lack of cobalt in the lower part of the injected interval causes a failure to polymerize. A chelating agent such as acetylacetone (also called 2,4-pentanedione) controls the dispersibility of the initiator and/or promoter in the polymerization mixture in the presence of materials which would cause the initiator to separate from the mixture.

I claim:

1. A method of consolidating a porous permeable formation using a consolidating composition which is not sensitive to pH, carbonates or water comprising contacting said formation with a polymerizable organic liquid mixture of (1) at least one vinyl type monomer having about 3-12 carbon atoms and containing at least one group from phenyl, carboxyl or nitrile and (2) at least one divinyl type monomer having about 3-12 carbon atoms, wherein each of said monomers is soluble in a low viscosity liquid aromatic hydrocarbon solvent; wherein said polymerizable mixture contains a polymerization promoter and a polymerization initiator comprising an organic peroxide, an azo compound or a combination thereof; and maintaining said polymerizable organic liquid mixture in contact with said formation until the monomers in said liquid mixture polymerize with the polymer chain and crosslink, having substantially all hydrocarbon linkages forming a crosslinked consolidated mass having a compressive strength after 24 hours of at least 120 psi.

2. A method of claim 1 of consolidating a porous permeable particulate formation into a water resistant mass wherein the polymerizable organic liquid mixture includes a filler comprising finely divided relatively inert solid particulate material.

3. A method of claim 1 of consolidating a porous permeable particulate formation into a water resistant mass wherein the polymerizable organic liquid mixture contains a chelating agent which controls the dispersibility of the initiator in the polymerizable mixture.

4. A method of claim 1 of consolidating a porous permeable particulate formation into a water resistant mass wherein the polymerizable organic liquid mixture includes an aromatic hydrocarbon solvent.

5. A method of claim 1 of consolidating a porous permeable particulate formation into water resistant mass wherein the polymerizable organic liquid includes a binder which facilitates coating of the polymerizable mixture onto the particulate formation.

6. A method of claim 1 of consolidating a porous permeable particulate formation into a water resistant mass wherein the polymerizable organic liquid mixture includes a binder which facilitates coating of the polymerizable mixture on to the particulate formation wherein the binder is selected from organic silanes, organic surfactants, and mixtures thereof which are dispersible in the polymerizable mixture.

7. A method of consolidating a porous permeable formation of claim 16 wherein the polymerizable organic liquid is applied to said formation to seal said formation, reducing the flow of fluids through said formation.

8. A method of claim 1 for consolidating a porous permeable formation comprising contacting said formation with a polymerizable organic liquid mixture of (1) at least one vinyl type monomer having 3-13 carbon atoms and containing at least one group from phenyl, carboxyl or nitrile and (2) at least one divinyl type monomer having 3-12 carbon atoms, wherein each of said monomers is soluble in a low viscosity liquid aromatic hydrocarbon solvent; wherein said polymerizable liquid mixture contains a polymerization promoter selected from cobalt naphthenate, cobalt octoate, N,N-dimethyl aniline and combinations thereof; and wherein said liquid mixture contains a polymerization initiator selected from alkyl peroxide, aryl peroxide, alkyl aryl peroxide, alkyl ketone peroxide, azo compounds and combinations thereof; and maintaining said polymerizable mixture in contact with said formation until said monomers polymerize, increasing the strength and water resistance of said formation.

9. A method of claim 1 of consolidating a porous permeable formation comprising mixing a low viscosity polymerizable organic liquid comprising a first monomer portion comprising at least one vinyl type monomer having about 3-12 carbon atoms selected from styrene, acrylic acid, methacrylic acid, acrylonitrile, methacrylonitrile, divinylbenzene and combinations thereof; a second monomer portion comprising at least one divinyl monomer having about 3-12 carbon atoms; a polymerization promoter which is soluble in hydrocarbon solvent; and a polymerization initiator which is soluble in a hydrocarbon solvent, said initiator comprising an organic peroxide, an azo compound or combinations thereof; applying said low viscosity polymerizable organic liquid mixture to said formation; and maintaining said polymerizable organic liquid mixture in contact with said formation until the monomers in said liquid mixture polymerizes, increasing the strength and water resistance of said formation.

10. A method of claim 1 of consolidating a porous permeable formation comprising injecting into said formation a polymerizable organic liquid mixture of (1) at least one vinyl type monomer having about 3-12 carbon atoms and containing at least one group from phenyl, carboxyl or nitrile and (2) at least one divinyl type monomer having about 3-12 carbon atoms wherein each of said monomers is soluble in a low viscosity liquid aromatic hydrocarbon solvent; wherein said polymerizable mixture contains a polymerization promoter and a polymerization initiator comprising an organic peroxide, an azo compound or combinations thereof; maintaining said polymerizable mixture in contact with said formation until the monomers polymerize, increasing the strength and water resistance and decreasing the permeability of said formation.

11. A method of claim 1 of consolidating a porous permeable subterranean earthen formation penetrated by a well comprising mixing a low viscosity polymerizable organic liquid mixture comprising (1) at least one vinyl type monomer having about 3-12 carbon atoms and containing at least one group from phenyl, carboxyl or nitrile and (2) at least one divinyl type monomer having about 3-12 carbon atoms wherein each of said monomers is soluble in a low viscosity liquid aromatic hydrocarbon solvent; wherein said polymerizable mixture contains a polymerization initiator comprising an organic peroxide, an azo compound or combinations thereof and a polymerization promoter; injecting said polymerizable mixture through said well into said formation; and maintaining said polymerizable mixture in contact with said formation until said monomers polymerize, forming a water resistant formation.

12. A method of claim 1 of consolidating a formation comprising mixing a low viscosity polymerizable organic liquid mixture comprising a first monomer portion comprising (1) at least one vinyl type monomer having about 3-12 carbon atoms and containing at least one group from phenyl, carboxyl or nitrile and (2) at least one divinyl type monomer having about 3-12 carbon atoms wherein each of said monomers is soluble in a low viscosity liquid aromatic hydrocarbon solvent; wherein said polymerizable mixture contains a polymerization promoter, a polymerization initiator comprising an organic peroxide, an azo compound or combinations thereof; and a filler comprising finely divided relatively inert solid particulate material; placing said polymerizable mixture in the desired location, and maintaining said polymerizable mixture in said location until said monomers polymerize, forming a water resistant mass.

13. A method of claim 12 of consolidating a formation into a water resistant mass wherein the polymerizable mixture includes an aromatic hydrocarbon solvent.

14. A method of claim 12 of consolidating a porous permeable earthen formation into a water resistant mass comprising applying to said formation a low viscosity organic liquid monomer mixture containing at least one low molecular weight vinyl type monomer and at least 1% divinylbenzene with a polymerization promoter and an organic peroxide polymerization initiator, and maintaining said mixture in contact with said formation until said monomers polymerize, forming a water resistant mass.

15. A method of claim 12 of consolidating a porous permeable formation into a water resistant mass wherein the polymerizable organic liquid includes a binder which facilitates applying the polymerizable mixture to the formation.

16. A method of claim 12 of consolidating a porous permeable formation into a water resistant mass wherein the polymerizable organic liquid mixture includes a binder which facilitates applying the polymerizable mixture to the formation, wherein the binder is selected from organic silanes, organic surfactants, and mixtures thereof which are dispersible in the polymerizable mixture.

17. A method of consolidating a porous permeable formation of claim 8 wherein the polymerizable organic liquid is applied to said formation, reducing the flow of fluids through said formation.

* * * * *

UNITED STATES PATENT AND TRADEMARK OFFICE
CERTIFICATE OF CORRECTION

PATENT NO. : U.S. 4,070,865
DATED : Jan. 31, 1978
INVENTOR(S) : Homer Charles McLaughlin It is certified that error appears in the above-identified patent and that said Letters Patent are hereby corrected as shown below:

Column 4, line 61, the word "groupd" should read --ground--. Column 6, Table I, first column, "FR-22" should read --FR-222--; after "VAZO-88" and before "CoN" insert the columnar heading --Promoters--. Column 7, Table I, in the first column after "9-11 Acid" insert the columnar heading --Monomers--.

Column 9, Table V at Test No. 11 in column titled "Gel Time," the number "870" should read --370--; Table V, Test No. 12 under the column titled "Compressive Strength," the number "14,0303" should read --14,030--; Table VI, at Test No. 2, under the column titled "Chemicals," the number "60&" should read --60%--; Table VI, at Test No. 8 under the column titled "Remarks," the number "824" should read --24--; Table VI at Test No. 9 in the column titled "Chemicals," the figure "25" should be moved to the column titled "Grams"; the phrase which reads "at 120°F..., 105 psi in" should be moved to the column titled "Remarks." Column 11, Table VI, at Test No. 10 in the column titled "Chemicals," the figure "15" should be moved to the column titled "Grams"; the phrase "at 120°F...psi in" should be moved to the column titled "Remarks"; Table VI, after Test No. 11, insert Test No. 12 to read as follows:

UNITED STATES PATENT AND TRADEMARK OFFICE
CERTIFICATE OF CORRECTION

PATENT NO. : U.S. 4,070,865
DATED : Jan. 31, 1978
INVENTOR(S) : Homer Charles McLaughlin It is certified that error appears in the above-identified patent and that said Letters Patent are hereby corrected as shown below:

```
--12    Styrene              70              @ 75°F - 140 psi in 24 hours
        Methacrylic acid     25              @ 120°F - 20 min., 2,366 psi
        60% Divinylbenzene    5      1       in 24 hours--.
```

Column 13, Table IX under the columnar heading "Gel Time, Minutes at °F," the columnar heading "130" should read --120--; Table X under the columnar heading "Compressive Strength," the footnote "1" should read --a--; Table X, at Test No. 3 and before Test No. 4, beginning under the columnar heading "Temp. °F through Shrinkage Diameter %" insert the following numbers:

```
--180         43         14,019         7.1--
```

Column 16, Table XII, in Footnotes d and i, the word "was" [second occurrence] should read --for--. Column 18, Table XV, under Batch II, columnar heading "Compressive Strength PSI," the number "9,695" should read --9,696--; Footnote c, second line, the word "shos" should read --shows--. Column 19, line 3 of Table XVI, under the columnar heading "Ligand Tested," the word "disulfite" read --disulfide--. Column 20, line 17, the number "16" should read --1--. Column 22, line 34, after the word "formation" insert --to seal said formation--.

*Signed and Sealed this*

*Fifth* Day of *September 1978*

[SEAL]

Attest:

RUTH C. MASON
*Attesting Officer*

DONALD W. BANNER
*Commissioner of Patents and Trademarks*